Sept. 19, 1933.  P. A. BRICK  1,927,680
ROAD GRADER
Filed June 16, 1931   2 Sheets-Sheet 1
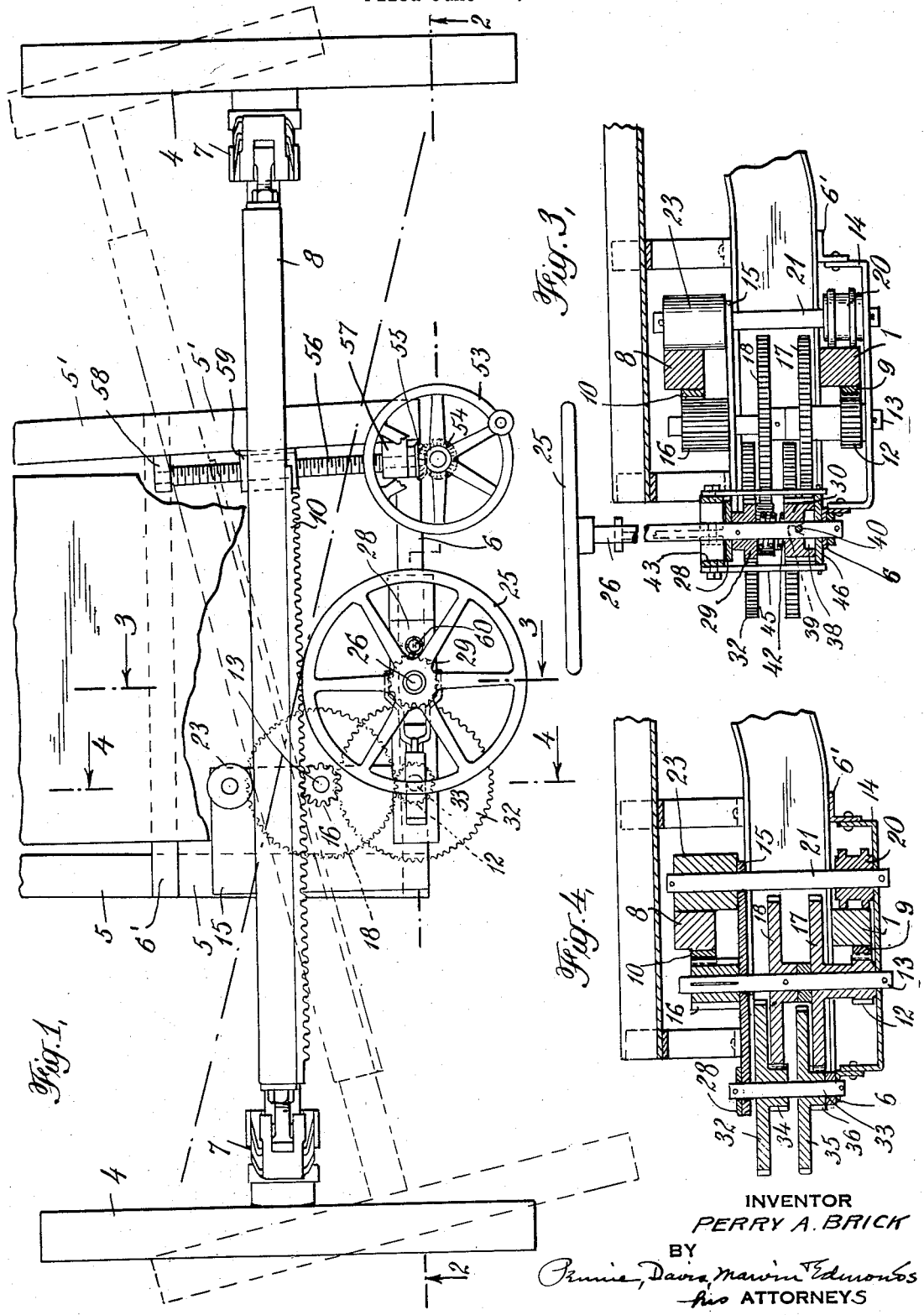
INVENTOR
PERRY A. BRICK
BY
Pennie, Davis, Marvin & Edmonds
his ATTORNEYS

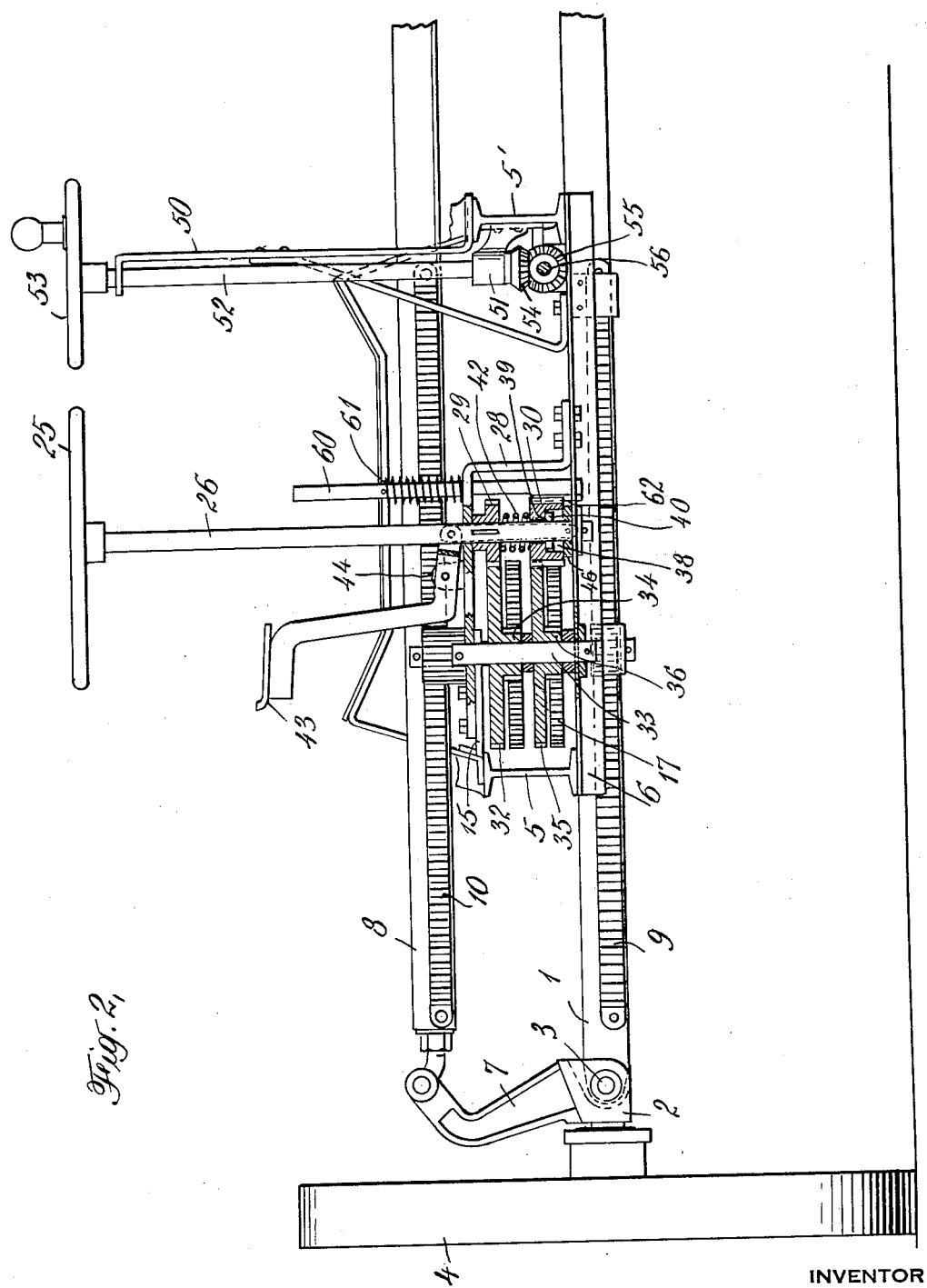

Patented Sept. 19, 1933

1,927,680

UNITED STATES PATENT OFFICE 1,927,680

ROAD GRADER

Perry A. Brick, Rome, N. Y., assignor to Revere Copper & Brass Incorporated, a corporation of Maryland Application June 16, 1931. Serial No. 544,859

7 Claims. (Cl. 37—157)

This invention relates to road graders and more particularly to improvements in the rear axle assembly for such machines.

According to one common form of grading machine, the frame of the vehicle is supported at its ends upon wheels and the grader is drawn over the road to be graded by means of a horse or tractor attached to its front end. From this frame intermediate its length is suspended a mold board extending to a position near the ground level and disposed at a slant to the direction of movement of the machine so that, as the grader travels along, the soft dirt encountered by the mold board is evenly spread across the road. This spreading action, however, exerts upon the mold board a side thrust tending to shift the machine laterally with respect to the direction of the pull transmitted by the horse or tractor, and to offset this side-slipping tendency it has been proposed to make the rear axle rotatable or skewable about a vertical axis under the control of the operator so as to adjust the wheels out of parallelism with the direction of movement of the machine, whereby the machine may be held to a straight course.

Since the dirt issuing from the trailing end of the slanting mold board is apt to pile up in the form of a ridge in advance of the hind wheels of the machine, mechanism is sometimes provided for allowing the operator to shift the rear axle endwise so as to remove the hind wheels beyond this ridge of dirt. Again road grading machines must at times travel along the sides of comparatively steep inclinations and in order to counteract its tendency to tip over under such conditions, the wheels are often arranged to be rocked about horizontal axes by mechanism under the control of the operator to maintain the wheels perpendicular, regardless of the slant assumed by the axle supporting the rear end of the machine.

The present invention has for its object to provide an improved form of rear axle assembly which permits of swinging the axle about a vertical axis, of shifting it lengthwise, and of independently rocking the wheels about horizontal axes, all under the manual control of the operator. An important feature of the invention is the provision of means whereby each of the above movements may be independently produced so that the shifting of the axle or wheels into a new position of adjustment does not disturb their other two positions of adjustment. According to the invention the mechanism for leaning or tilting the wheels is mounted upon the machine frame and does not participate in the endwise movement of the axle thus differing from those graders known to the prior art in which the wheel-leaning mechanism is carried by the axle. This permits locating the axle beneath the grader frame instead of beyond the rear end of the frame. The use of a rack and gear mechanism for leaning the wheels, as contemplated by the invention, by reason of its simplicity of construction and positiveness of operation, results in an improved operation of the grader.

The invention will be better understood by reference to the attached sheets of drawings illustrating a preferred embodiment in which: Figure 1 is a plan view of the rear end of a road grading machine and illustrating the rear axle assembly of this invention; Figure 2 is an end elevation of the rear axle assembly on the line 2—2 of Figure 1, the wheel on one end of the axle being omitted; Figure 3 is a fragmentary section on the line 3—3 of Figure 1; and Figure 4 is a fragmentary section on the line 4—4 of Figure 1.

As shown in Fig. 2, the rear axle assembly of the road grading machine consists of a main axle 1 of square or rectangular cross-section upon each end of which is carried a stub-axle 2 arranged to swing about a horizontal or transverse pivot pin 3 inserted through an opening in the axle 1. Upon each stub axle is revolubly mounted a wheel 4. The main axle 1 supports a pair of I-beams 5 and 5', constituting the frame of the machine and held in parallel spaced relation at their ends by angle irons 6 and 6' rigidly fastened to the bottom flanges of the I-beams. The axle, being unconnected with the I-beams, is free to shift in all directions relative thereto. Formed integrally with the stub axles 3 and extending upward therefrom are arms 7, the free ends of which are connected by a cross-tie 8 of square or rectangular cross-section located a short distance above and lying parallel to the axle. Attached to the rear vertical face of the axle 1 and extending for a substantial portion of its length is a rack 9; and likewise upon the corresponding face of the cross-tie 8 is fastened a similar rack 10.

Engaging the lower rack 9 is a pinion 12 rotatable mounted on a vertical spindle 13, which latter spindle is in turn rotatably supported at its upper end in a plate 15 fastened to the upper flange of I-beams 5, said spindle being supported at its lower end in a plate 14 extending between the two adjacent angle irons 6 and 6'. The plate 14 besides providing a bearing for the lower end of the spindle also serves to retain the axle in loose association with the machine frame. There is keyed to the upper end of spindle 13 which projects above the plate 15 a pinion 16 meshing with the rack 10 on the cross-tie 8. Integral and concentric with the pinion 12 is a gear 17 of somewhat larger diameter, and immediately above the gear 17 is a similar gear 18 which is pinned to the spindle 13. It will be apparent that the pinion 12 and integral gear 17 must turn as a unit around the spindle 13, and the pinion 16 and gear 18, each being individually fastened to the shaft 13, will rotate with the shaft and in unison with each other. Engaging the flat face of the axle 1 opposite to that which carries the rack 9 and at a point directly opposite the pinion 12 is a roller 20 rotatable on a vertical rod 21, this rod being supported at its lower end in the plate 14 and at its upper end in the plate 15. The end of the rod 21 projects above the plate 15 and rotatably carries thereon a roller 23 contacting with the flat rear face of cross-tie 8 at a position opposite the pinion 16.

In order to impart rotation to the gears 17 and 18 there is provided a hand wheel 25 at the top of a vertical shaft 26, this shaft being rotatably supported by the angle iron 6 and also, intermediate its length, by a box plate 28. The box plate 28 is fastened at one end to the plate 15 and at its other end to the angle iron 6. The shaft 26 carries near its lower end a pinion 29 which is keyed to the shaft so as to rotate therewith. At the end of the vertical shaft is an axially shiftable pinion 30 which, as will be explained later, may be operatively connected to or disconnected from the shaft. The pinion 29 engages an intermediate gear 32 mounted upon a countershaft 33 vertically sustained between the angle iron 6 and the plate 15. The gear 32 has integrally and concentrically formed thereon a gear 34 of smaller diameter which engages the gear 18 on spindle 13 so that rotation of gear 32 will cause rotation of gear 18. On the countershaft 33 and located below the gears 32 and 34 and duplicative of these gears, are integral gears 35 and 36, the smaller gear 36 meshing with gear 17 on spindle 13, whereby movement of gear 35 will transmit motion to gears 17 and 12. From the construction which has just been described, it will be apparent that when the hand wheel 25 is rotated in either direction this will cause rotation of the pinions 29 and 30, and since these pinions are in mesh with the gears 32 and 35, respectively, will impart rotation to the gears 18 and 17 through the gears 34 and 36 integrally formed on gears 32 and 35. This will result in shifting the axle 1 to the right or left under the urge of pinion 12 which engages the rack 9 and a corresponding displacement of the cross-tie 8 by the pinion 16 which engages the rack 10 on the cross-tie.

Reverting now to axially shiftable pinion 30 which, as has previously been stated, is arranged for connection with and disconnection from the shaft 26. This pinion has formed upon its lower face a central recess 38 (Fig. 3) on the bottom of which is provided a diametrically disposed slot 39 capable of receiving the ends of a pin 40 passing diametrically through the shaft 26 and projecting beyond its circumference on opposite sides thereof, this pin when seated in the slot functioning to lock the pinion 30 to the shaft 26. A helical spring 42 interposed between the pinions 29 and 30 tends always to press the latter pinion downwardly against the pin 40. The pinion 30, however, may be raised against the action of the spring by means of a treadle 43 (Fig. 2), which is pivoted upon lugs extending upwardly from box plate 28. The end of the treadle remote from its foot-engaging end is forked so as to span the shaft 26 and from the ends of the fork is suspended a stirrup 45 (Fig. 3), carrying at its end a cross-plate 46 which is apertured to freely pass the shaft 26.

By the construction just described, upon depression of the treadle 43, the stirrup 45 will be raised and with it the cross-plate 46 which strikes the lower face of pinion 30 and elevates it against the action of spring 42, removing the pin 40 from the slot 39 and unlocking the pinion from shaft 26. Consequently under such conditions when the shaft 26 is rotated, the pin 40 idly revolves in the recess 38 and motion is not communicated to the pinion 30. This turning movement of the shaft however will be transmitted to the pinion 16, engaging rack 10 on the cross-tie 8 and the cross-tie will be shifted endwise relative to the axle 1, thus leaning or tilting the wheels out of a position perpendicular to the axle.

In order to normally maintain the pinion 30 locked against rotation a rod 60 is provided which extends vertically down through aligned openings in the box plate 28 and angle iron 6 and this rod carries at its lower end a key 62 adapted to enter between adjacent teeth of the pinion 30. A helical spring 61 encircling the rod and pressing at one end against plate 28 and at its other against an abutment on the rod serves to hold the rod raised with the key engaging the pinion 30. When the pinion is thus locked the position of adjustment of the axle endwise and the degree of tilting of the wheels is preserved. When, however, the rod is depressed by pressure applied to its upper end which projects above the floor of the platform occupied by the operator, the key 62 is removed from between the teeth of pinion 30 and this pinion is free to revolve.

The mechanism by which the axle may be swung about a vertical axis will now be described. Suitably supported within brackets 50 and 51 both fixed upon I-beam 5' is a vertical shaft 52, having at its upper end a hand wheel 53. The lower end of this shaft is provided with a bevel gear 54 which engages a complementary bevel gear 55 on a screw-shaft 56 rotatably journalled in bearings 57 and 58 on I-beam 5' and along this screw-shaft travels an internally threaded block 59, one side of which rubs against the lower flange of the I-beam 5'. Projecting downwardly from the bottom of this block are suitable lugs (not shown), which engage opposite sides of the axle 1. Therefore when the block 59 is moved along the screw through rotation of the latter, it carries with it the axle 1, whereby to swing the axle about a vertical axis located midway between pinion 12 and roller 20, the space between this pinion and gear being such as to permit such turning movement but insufficient to allow the pinion to become disengaged from the rack.

In operation, to shift the axle endwise the operator places his foot upon the projecting end of the rod 60, and depresses it to release the key 62 from pinion 30. This, as has already been explained, permits the hand wheel 25 to be turned transmitting motion through the vertical shaft 26 and gear train 30, 35, 36, 17 and 12 (engaging the rack 9) to shift the axle 1 endwise. At the same time motion is transmitted through the second train of gears 29, 32, 34, 18 and 16 (engaging the rack 10) to correspondingly shift the cross-tie 8 in unison with the axle. When the proper adjustment of the axle endwise has been attained the operator releases rod 60 which again engages the key 62 between the teeth of pinion 30 to maintain this position of adjustment. Supposing now that the operator desires to lean or tilt the wheels with respect to the axle in order to accommodate the grading machine to sloping ground. The treadle 43 is depressed which raises the gear 30 through the stirrup 45 to remove the pin 40 from the slot 39 in the bottom of recess 38. With the treadle held depressed, rotation of the hand wheel 25 transmits motion through the gear train 29, 32, 34, 18 and 16 to shift the cross-tie 8. The cross-tie being pivoted at its ends to the two arms 7 consequently rocks both stub-axles 2, simultaneously tilting the wheels 4. However, no movement is communicated to the axle 1 since the shaft 26 revolves idly within the pinion 30 the pinion 30 being uncoupled from the shaft 26 so that the second train of gears is unaffected. The second gear train remains locked in its original position of adjustment by reason of the key 62 on the bottom of rod 60 engaging between the teeth of pinion 30.

To rock the axle about a vertical axis the operator turns the hand wheel 53, which through the shaft 52 rotates bevel gears 54 and 55, imparting rotation to the screw shaft 56. This causes the threaded block 59 to travel along the screw shaft and swing the axle about an axis located midway between the pinion 12 and the roller 20. Movement of the axle carries with it the cross-tie 8 since the latter is unitarily connected with the axle through the stub-axles 2.

I claim:

1. In a grading machine, a frame, a rear axle assembly comprising an axle, a pair of wheels associated with opposite ends of the axle, means for shifting the frame relative to the axle, means for tilting the wheels about transverse axes and a single member operatively connected to the axle shifting and the wheel tilting means for selectively operating either of said means.

2. In a grading machine, a frame, a rear axle assembly comprising an axle, a pair of wheels associated with opposite ends of the axle, means for rocking the axle about a vertical axis, means for shifting the frame relative to the axle, means for tilting the wheels about transverse axes, and an operating member normally connected to both of the two last-named means but arranged to be disconnected from one of said means, whereby said means may be simultaneously or independently operated.

3. In a grading machine, a rear axle assembly comprising a main axle, a pair of stub axles associated with opposite ends of the main axle, a cross-tie connecting the stub axles, a rack on the main axle, a rack on the cross-tie, gears engaging each of said racks and unitary means stationarily supported upon the grading machine adapted to operate either both or one of said gears.

4. In a grading machine, a rear axle assembly comprising an axle, a pair of stub axles associated with opposite ends of the axle, a cross-tie connecting the stub axles, a rack on the main axle, a rack on the cross-tie, a pair of gears for engaging the racks, a revoluble shaft, a second pair of gears on the shaft and normally in operative connection with the rack operating gears, and means for disconnecting one of the gears from operative connection with the revoluble shaft so that upon rotation of the revoluble shaft motion will be transmitted only to the gear engaging the rack on the cross-tie.

5. In road grading apparatus, a rear axle assembly combination comprising a main-axle, a pair of stub-axles associated with opposite ends of the main axle, a cross-tie connecting the stub-axles, a rack on the main-axle, a rack supported upon and bodily movable with the cross-tie, rack-engaging means associated with both of said racks for imparting a thrust to the axle and the cross-tie, and a unitary operating member in association with said rack-engaging means to give a desired thrust simultaneously to both the main axle and the cross-tie.

6. In road grading apparatus, a rear axle assembly combination comprising, a main-axle, a pair of stub-axles associated with opposite ends of the main-axle, a cross-tie connecting the stub-axles, a rack on the main-axle, a rack supported upon and bodily movable with the cross-tie, toothed means engaging each of said racks for imparting a thrust to the axle or the cross-tie, means for skewing said main-axle relative to the main frame, and a unitary operative member for operating said toothed means both simultaneously.

7. In road grading apparatus, a rear axle assembly combination comprising, a main-axle, a pair of stub-axles associated with opposite ends of the main-axle, a cross-tie connecting the stub-axles, a rack on the main-axle, a rack on the cross-tie, means for skewing the main-axle, gears engaging each of said racks, and unitary means adapted to operate one or both of said gears.

PERRY A. BRICK.